June 11, 1963　　M. P. WEISEL ETAL　　3,093,511
SOLID INORGANIC INSULATION FOR METALLIC CONDUCTORS AND
ELECTRICAL MEMBERS INSULATED THEREWITH
Filed Feb. 17, 1960

Coating comprising mica and a siloxane resin.

Inorganic coating

WITNESSES:

INVENTORS
Melvin P. Weisel and
Donald H. Hogle.
BY
ATTORNEY

United States Patent Office 3,093,511
Patented June 11, 1963

3,093,511
SOLID INORGANIC INSULATION FOR METALLIC CONDUCTORS AND ELECTRICAL MEMBERS INSULATED THEREWITH
Melvin P. Weisel, Pittsburgh, and Donald H. Hogle, Monroeville, Pa., assignors to Westinghouse Electric Corporation, East Pittsburgh, Pa., a corporation of Pennsylvania
Filed Feb. 17, 1960, Ser. No. 9,368
6 Claims. (Cl. 117—232)

The present invention relates to inorganic insulation for electrical metallic conductors and to the method of applying the same. The invention has particular reference to electrical metallic conductors provided with heat-hardened, solid inorganic insulation adapted for use at temperatures of about 500° C. and higher.

This invention relates also to electrical apparatus comprising electrical metallic conductors insulated with inorganic insulation, which electrical members are capable of satisfactory operation at temperatures of about 500° C. and higher.

Coatings on metallic conductors, such as wires, must be tough and hard to withstand the severe mechanical abuse to which windings comprising the coated metallic conductors are subjected in service. Also, coils frequently are wound from insulated wire under considerable pressure and at high speed. It is essential that the insulating coating applied to the wire be capable of withstanding the abrasion, bending stresses, and heavy pressures encountered during the winding without breaking, cracking, or otherwise disrupting from the wire.

Organic enameling compositions are used widely in the electrical industry to provide insulation for metallic conductors such as wires. In general, such organic coatings are not capable of withstanding for long periods of time operating conditions which subject the coatings to temperatures substantially above 200° C. There is need in the electrical industry for a wire coating composition which, after application and when hardened on the wire, will satisfactorily withstand, for relatively long periods of time, temperatures of 500° C. and higher.

The present invention is directed to a method of applying inorganic insulating materials to metallic conductors and to metallic conductors provided with the applied inorganic insulation. This invention is directed also to electrical apparatus comprising a metallic electrical conductor having inorganic insulation applied thereto.

This invention is directed further to a coating composition comprising finely divided mica and an organopolysiloxane and to electrical conductors coated therewith. The metallic conductor with the applied mica-organopolysiloxane coating composition is usually formed first into its final desired configuration such, for example, as by winding the coated metallic conductor on a mandrel to provide a magnet coil for use in a transformer or like electrical apparatus. The coated metallic conductor is then subjected to a heat treatment whereby the organic substituents of the organopolysiloxane are decomposed and volatilized therefrom. The heat treatment removes the organic substituents of the organopolysiloxane portion of the applied coating leaving on the metallic conductor an insulating coating consisting substantially of inorganic insulating material.

For a complete understanding of the nature of this invention, reference is made to the following detailed description taken in conjunction with the accompanying drawing, wherein.

Figure 1:
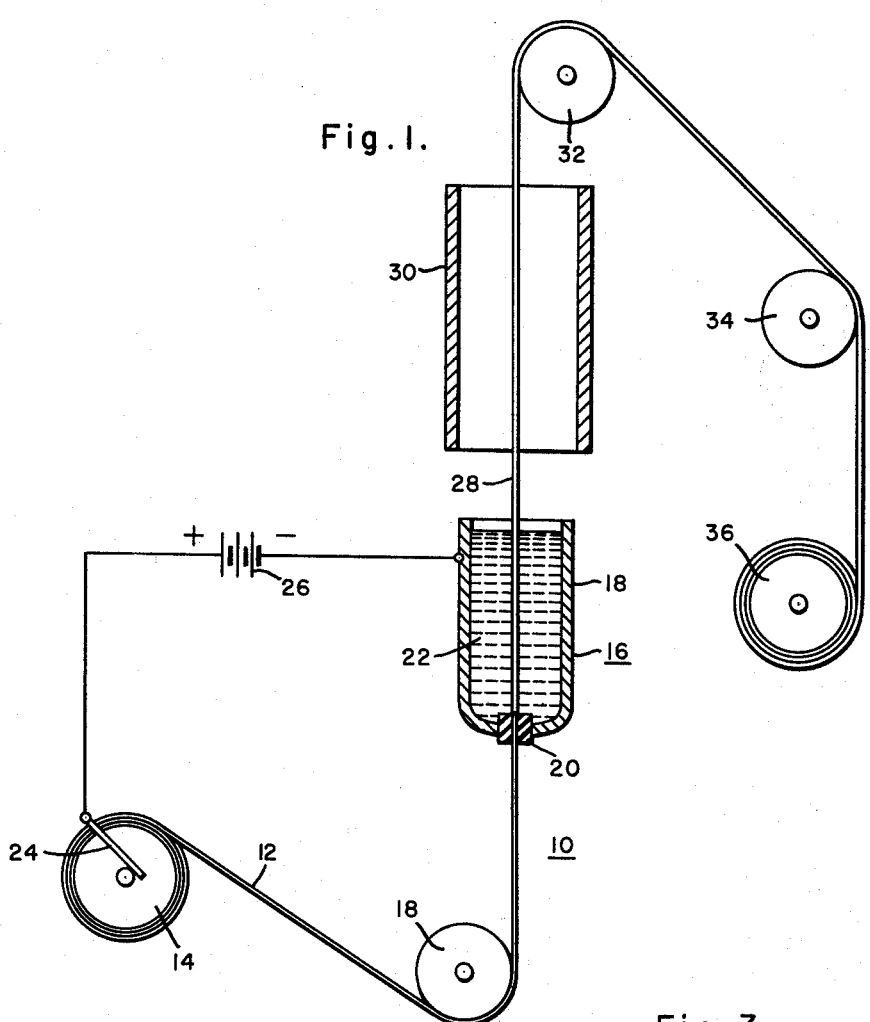
FIGURE 1 illustrates one form of apparatus suitable for applying a coating composition in accordance with this invention.

Briefly, in accordance with this invention, a coating composition comprising finely divided mica flakes and an organopolysiloxane is deposited electrophoretically on a metallic conductor, and the coated metallic conductor is subsequently subjected to a heat treatment whereby the organic substituents comprising the organopolysiloxane are removed therefrom to provide a highly satisfactory inorganic electrically insulating coating on the metallic conductor.

The coating composition employed in carrying out this invention is a suspension or an emulsion comprising mica flakes in finely divided form and an organopolysiloxane resin. Admixed therewith is a small amount of an anionic surfactant and a small amount of a non-ionic wetting agent.

In order to provide on the metallic conductor a highly satisfactory inorganic insulating coating, the proportions of the ingredients employed in preparing the coating composition, for electrophoretic deposition, are critical.

The coating composition employed in this invention will comprise, by weight, the following ingredients suspended in a suitable medium: from 95 to 40 parts of finely divided mica flakes, from 5 to 60 parts of an organopolysiloxane resin, from 0.02 to 0.5 part of an anionic surfactant, and from 1 part to 5 parts of a non-ionic wetting agent.

A liquid medium is employed in preparing the suspension of the coating composition for use in this invention. The liquid medium should preferably be distilled water, although other media can be used for this purpose, such, for example, as acetone, alcohol, and mixtures of alcohol and distilled water. Suitable alcohols include methanol, ethanol, propanol, isopropanol, and mixtures of these alcohols.

Organopolysiloxane resins suitable for use in the invention are available commercially as solutions, usually about 50% resin solids in an aromatic solvent, such as toluene and xylene. The organopolysiloxanes can be, and preferably are, employed in commercially available solution forms in preparing the suspensions for use in this invention. Thus, the suspending medium will usually comprise the solvent for the organopolysiloxane and the medium above described.

For the purposes of obtaining a homogeneous suspension, it is recommended that the ingredients be mixed well prior to and during use.

For the purposes of this invention, the mica is employed in a size of approximately 0.5 micron to 25 microns, particle sizes of from about 2 to 5 microns are preferred. Mica flakes can be reduced to the desired particle size by ball-milling or by pulverizing the mica flakes in a high speed blender. Other methods can be employed if desired. It has been determined that micro mica available commercially as C1000 and C3000 can be employed satisfactorily.

Before using the finely divided mica flakes it is advisable to remove all foreign water-soluble materials therefrom. These materials are generally salts and electrolytes which can produce gas during the electrophoretic deposition of the coating on the metallic conductor and will cause the applied coating to be foamy, slimy, and otherwise quite unsatisfactory. These undesirable constituents can be removed by washing the mica flakes in distilled water. Other suitable means can be employed for this removal of undesirable constituents.

The organopolysiloxane resins (referred to hereinafter for convenience, as "siloxanes") used in preparing the coating composition of this invention include those siloxanes that will form a stable emulsion and will, in the presence of finely divided mica, be deposited electrophoretically at a favorable rate so that after heat treatment the applied inorganic coating will comprise from about 20% to 30% by weight, of silica (SiO₂).

Furthermore, the siloxane resin should be clean burning. That is, during the applied heat treatment the organic substituents comprising the siloxane should be substantially completely removed leaving substantially pure oxides of silicon such as silica ($SiO_2$). The oxides of silicon cooperate with the applied mica flakes to provide a highly satisfactory inorganic insulating coating on the metallic conductor.

Siloxane resins that can be employed in this invention comprise the following typical structure:

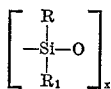

where R and $R_1$ can be the same or different organic radicals attached through carbon silicon linkages to at least some of the silicon atoms. The ratio of total R and $R_1$ can vary from 1 to 2, and $x$ can have a value of 4 or more. Suitable organic radicals represented by R and $R_1$ are aliphatic radicals such, for example, as methyl, ethyl, propyl, isopropyl, butyl and higher; aryl, alkaryl and aralkyl radicals, such as phenyl, tolyl, xylyl, naphthyl, benzyl, and diphenyl; and alkenyl radicals such as allyl, methallyl and the like.

The siloxane resins can form linear, branched, cross-linked and cyclic structures, usually combinations of all types are present in a single commercial batch of the siloxane. The terminal or end groups of any linear or branched structure can be represented as follows:

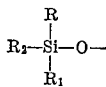

where R and $R_1$ are as defined above, and $R_2$ can be an aliphatic, alkenyl, aryl, alkoxy, aryloxy, or hydroxy radical.

Good results are obtained from methyl phenyl siloxanes having from about 1.2 to 1.95 phenyl and methyl groups per silicon atom. The phenyl groups can be replaced with up to 50% of diphenyl groups with good results.

Siloxane resins that have been found to be particularly satisfactory for the purposes of this invention are the tolyl methyl phenyl siloxanes having from about 1.3 to 1.6 tolyl, methyl, and phenyl groups per silicon atom. The mol percent of the tolyl groups will vary from about 35 to 45, the mol percent of methyl groups from about 25 to 35, and the mol percent of the phenyl groups from about 25 to 35.

Anionic surfactants are well known in the art and include sulfated fatty alcohols, alkyl sulfonates, alkyl aryl sulfonates, sulfated fatty acids, and alkyl sulfates.

Sodium salts of sulfated fatty alcohols are satisfactory anionic surfactants. As available commercially this type of anionic surfactant is usually a mixture of the sodium salts of sulfated fatty alcohols made by reducing the mixed fatty acids of cocoanut oil, of palm kernel oil, of cottonseed oil, and of fish or sperm oils. Sometimes natural waxes such as spermaceti, wool fat, and beeswax are sulfated directly. The mixture of the sulfated fatty alcohols, which is known commercially as "lauryl alcohol," comprises about 15% mixed $C_8$ and $C_{10}$ (octyl and decyl) alcohols, 40% $C_{12}$ (lauryl or dodecyl) alcohol, 30% $C_{14}$ (myristyl or tetradecyl) alcohol, and 15% mixed $C_{16}$ and $C_{18}$ (cetyl, stearyl and oleyl) alcohols. However, individual sodium salts of sulfated fatty alcohols are contemplated and include sodium lauryl sulfate, sodium octyl sulfate, sodium decyl sulfate, sodium dodecyl sulfate, sodium myristyl sulfate, sodium cetyl sulfate, sodium stearyl sulfate and sodium oleyl sulfate.

The above class of anionic surfactants are available commercially under the following proprietary names: Duponol, Gardinol, Modinal, Orvis, Maprofix, Tergavon, Tergitol Anionic 7, Tergitol Anionic P–28, Tergitol Anionic 4, Tergitol Anionic 08, Tergitol Anionic EH, Dreft, and Drene.

The alkyl or alkane sulfonates can be the sodium salts of sulfonated higher fatty acids such as those found in cocoanut oil, palm oil, olive oil and the like. This will give rise to sodium salts of sulfonated mixed higher fatty acids, although the sodium salts of the sulfonated individual acids can be employed. Esters of sulpho fatty acids can also be employed. Likewise amides of the foregoing, such as sulfonated cocoanut oil fatty acid amide can be used.

The alkyl aryl sulfonates available commercially are one or more sodium salts of alkyl (either short or long chain, usually the latter), benzene or naphthalene sulfonic acids. The alkyl can be the lower alkyl, such as methyl, ethyl, propyl, isopropyl, butyl, or it can be and is usually, a higher alkyl having from 8 to 18 carbon atoms such, for example, as octyl, nonyl, decyl, dodecyl, tetradecyl and keryl.

These higher alkyls can be derived from the fatty acids of cocoanut oil, palm oil and olive oil, or from a hydrocarbon kerosene fraction containing predominantly 12 carbon atoms to the molecule. Specifically, it may be mentioned the sodium salt of the sulphonic acid derived from condensing benzene with a chlorinated kerosene fraction of this nature (keryl chloride). Also may be mentioned sodium isopropyl-naphthalene sulfonate, sodium butyl naphthalene sulfonate, sodium keryl benzene sulfonate, and sodium dodecyl benzene sulfonate.

Included in the foregoing category are the following commercially available materials: Nacconol, Nekal, Sorapon, NSAE, Santomerse, Ultrawet and Xynomine.

Other alkyl aryl sulfonates which can be employed can be found in Table 1, page 126, "Surface Active Agents," by Schwartz-Perry (1949).

Non-ionic wetting agents found useful are generally compounds prepared by reacting a hydrophobic hydroxy compound (either a phenol or an alcohol) with several mols of ethylene (or propylene) oxide. Typical of the commercial products falling within this category are Igepal CA–710, Igepal CO–430, Igepal CO–530, Igepal CO–610, Igepal CO–630, Igepal CO–710, Igepal CO–730, Igepal CO–850, Igepal CO–880, Igepal DM–710, Leonil O, Leonil OX, Leonil FFO, Peregal O, Emulphor EL–620, Emulphor EL–719, Emulphor ON–870, Emulphor VN–430, Emulphogene AM–870. Similar products are sold under the names Energetic S and Energetic W–100. A similar product is Triton NE. Similar non-ionic wetting agents are prepared by reacting ethylene or propylene oxide with fatty acids or by esterifying polyethylene glycol with a fatty acid. Typical of this class are Tergitol non-ionic NPX, Tergitol non-ionic TMN, Tergitol non-ionic XC, Tergitol non-ionics NP–14 and Tergitol non-ionic TD, Neutronyx, nad Glycaid.

Also, non-ionic wetting agents can be prepared by reacting a hydroxy ester or hydroxyamide of a fatty acid with ethylene oxide to form a polyethylene ether. Fatty amides and hydrophobic sulfonamides have also been reacted with ethylene oxide.

In addition, there is a series of fatty acid esters of anhydrosorbitols which have been solubilized by etherifying the free hydroxyl groups with ethylene oxide under the name of Tweens. The anhydrosorbitol esters which have not been etherified are sold under the name Span. There are numerous Tweens and Spans available on the market. Similar compounds are Arlacel C, G–2162, G–672, G–7596 J, and Myrj 45.

Other types of non-ionic wetting agents include compounds made by heating together 1 mol of a higher fatty acid with approximately 2 mols of diethanolamine. Compounds of this nature are sold under the names of N-100 and Cerfal-1400, under the name of Dianol G, and under the names of Alrosol, Alrosol B, Alrosol C, Alrosol CS, Alrosol H and Alrosol O.

The foregoing and other non-ionic wetting agents are disclosed in pages 202-217, "Surface Active Agents," by Schwartz-Perry (1949).

In preparing the suspension of the coating composition of this invention, the commercially available solution of siloxane resin (usually about 50% resin solids content) and the non-ionic wetting agent are thoroughly admixed for about ½ minute to 3 minutes in a suitable mixing apparatus such, for example, as a high speed blender. Distilled water is then added slowly while mixing and the mixture of water, siloxane solution, and non-ionic wetting agent are thoroughly admixed for about 3 to 5 minutes. To this mixture there is added a previously prepared mixture of finely divided mica flakes, anionic surfactant and water. The ingredients are thoroughly admixed in a blender for example, to provide an emulsion wherein the mica flakes are substantially uniformly suspended throughout.

By way of illustration, the following specific example of a method of preparing a suspension of the coating composition for use in this invention is given.

*Example 1*

Into a high speed blender, there are introduced the following ingredients: 100 grams of a 50% resin solids solution of a tolyl methyl phenyl siloxane resin dissolved in toluene. The ratio of the tolyl methyl phenyl groups per silicon atoms is 1.4 and the mol percent of the tolyl groups is 40, the methyl groups 30, and the phenyl groups 30.

10 grams of Tergitol (non-ionic wetting agent). These ingredients are thoroughly admixed in the blender for a period of about 1 minute and there is added, slowly, 100 grams of water while mixing for an additional 4 minutes to provide an emulsion. One hundred grams of finely divided mica flakes having an average particle size of five microns and 0.2 gram of Aerosol OT (anionic surfactant) are suspended in 1,000 grams of distilled water by mixing in another blender. This mica suspension is added to the above first prepared emulsion followed by high speed blending for a period of time for about 15 minutes. The resulting suspension is employed in an electrophoretic cell in carrying out this invention.

Electrical metallic conductors that can be coated in accordance with this invention are silver, copper, nickel, nickel-chromium, beryllium-copper, iron-chromium, aluminum, nickel coated copper, and the like. In fact, any type of electrically conducting or semiconducting wire, plate, or bar can be treated in accordance with this invention. Materials which do not respond readily to this treatment can be plated or coated with a thin layer of nickel or a similar metal, which is especially adapted thereto, before being subjected to the hereindescribed electrophoretic deposition treatment.

The conductor can be circular in cross-section, or it can be of any other geometrical cross-section. It can vary from strands of extremely small diameter to wires, rods, bars, or plates of very large size. In place of depositing the coating composition over the entire surface of the metallic conductor, it can be deposited on particular portions thereof, for example, by masking the remaining portions with a coating of suitable material which can thereafter be removed, such as cellulose, masking tape, waxes, lacquers, and the like. The masking material is generally non-conductive and therefore no deposit of the coating composition is made upon it.

Referring to FIGURE 1 of the drawing, there is shown apparatus 10 which is suitable for depositing electrophoretically the coating composition of this invention on metallic conductors, the metallic conductors shown in the drawing being wire of circular cross section. A wire 12 is unwound from a spool 14 and passes on its way to a coating cell 16 around a mandrel 18. Within the cell 16 the wire 12 is electrophoretically coated with the coating composition of this invention, and for this purpose the coating cell 16 comprises a container 18 and a rubber gasket 20 through which the wire 12 passes into the coating cell 16. The container 18 contains a coating solution 22 consisting of a water suspension of the coating composition of this invention.

Preferably, the container 18 itself forms one electrode of the coating cell 16 and for this purpose the container is made of an electrically conducting material such as copper. The wire 12, to be coated, forms the other electrode of the cell and electrical connection thereto is provided by a brush 24 which contacts the wire spool 14 and is thus connected to the wire 12.

The current for depositing the coating composition is supplied by a suitable source of direct current shown as a battery 26, the negative pole of which is connected to the container 18 and the positive pole of which is connected to the contact brush 24.

The current used for the electrophoretic coating in the cell 16 depends, for a given coating composition, on the time of deposition, the length of time of immersion of the wire in the suspension of the coating composition, the speed of the wire through the coating cell, and the desired thickness of the coating. The above variables can be easily adjusted and determined by those skilled in the art in order to obtain the desired coating thickness.

For continuous coating of wire, a container (not shown) containing a suspension of the coating composition of this invention can be connected to the coating cell 16 in any suitable manner, such as by means of a rubber hose connection or the like, to supply a continuous flow of coating composition into cell 16. An overflow connection (not shown) will be provided above the intake connection to provide for supplying a continuous flow of the coating composition. Continuous agitation of the suspension of coating composition in the container is recommended.

Coated wire 28 emerges from coating cell 16 and passes into oven 30 provided with suitable heating means (not shown), as for example, electrical resistance units. In the furnace or oven 30, the coated wire 28 is subjected to a heat treatment to cure the siloxane resin portion of the coating composition and to remove water and like volatiles from the applied coating. For this purpose, the oven will usually be maintained at a temperature of from about 350° C. to 450° C. The coated wire is subjected to this heat treatment for a period of about ½ to 2 minutes.

On emerging from the oven 30, the coated wire 28, having been cooled by air, passes over mandrels 32 and 40 and thence onto a spool 36, for storage or the like.

Figure 2:
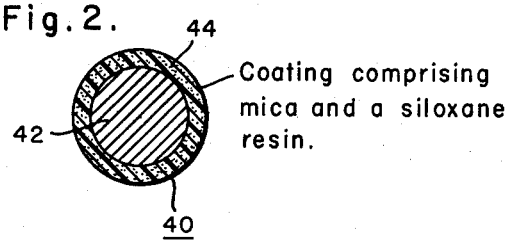
FIG. 2 is a cross-sectional view of a metallic conductor coated with finely divided mica and an organopolysiloxane.

Referring to FIGURE 2 of the drawing, there is shown a coated conductor 40 coated in accordance with this invention. The coated conductor 40 comprises a wire conductor 42 and a coating composition 44, the coating composition comprising finely divided mica flakes and heat cured siloxane resin.

The wire with applied coating is tough, flexible, and has good resistance to abrasion. The coated wire can be easily and readily formed into desired configuration as, for example, by winding the coated wire around a mandrel to provide a coil for use in electrical apparatus such as transformers, motors, control coils, and the like.

After the coated wire has been formed into its desired configuration, it is heated to a temperature of from about 400° C. to 650° C. depending on the properties of the applied siloxane resin and the heat stability of the metallic conductor. Thus, for example, the extreme temperature will not be employed when the metallic conductor is aluminum since aluminum begins to fuse at or near 650° C. The heat treatment is applied until their remains on the wire a coating consisting essentially of inorganic materials. The organic substituents of the siloxane resin portion of the coating composition are decomposed and volatilized from the wire during the heat treatment usually in a period of time of from about 1 hour to 4 hours, leaving an electrical conductor insulated essentially with inorganic insulating materials. Substantially all the anionic surfactant and the non-ionic wetting agent are removed also during this heat treatment. It is possible that very small amounts of these ingredients will be present in the resulting inorganic coating; however, no untoward effects result. The inorganic insulating coating consists essentially of finely divided mica flakes and the oxides of silicon, mainly silica ($SiO_2$), which consittute substantially all the residue remaining after the organic substituents of the organopolysiloxane have been removed. During the heat treatment the oxides of silicon formed and the finely divided mica flakes cooperate to form a highly satisfactory inorganic insulating coating on the wire conductor.

Figure 3:
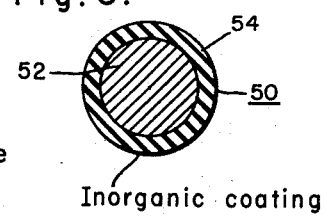
FIG. 3 is a cross-sectional view of a metallic conductor insulated with inorganic material.

Referring to FIGURE 3 of the drawing, there is shown inorganic insulated conductor 50 comprising electrically metallic conducting wire 52 and the inorganic insulating coating 54 of this invention.

The following example is illustrative of this invention.

*Example II*

The coating suspension of Example I is placed in a coating cell similar to that shown in FIGURE 1 of the drawing and A.W.G. No. 22 silver wire is coated therein in the manner above described with reference to FIGURE 1 of the drawing. The wire is moved through the coating composition at a speed of about 17 feet per minute, and the coated wire is moved through a 15-foot baking tower at the same rate of speed, the baking tower being maintained at a temperature of about 430° C. The voltage applied across the coating bath is 90 volts. The coating composition suspension is maintained at a height of about 10 inches in the coating cell. The applied coating is smooth, adherent, abrasion resistant and continuous. The thickness of the coating is about 1.6 mils. The coated wire is wound around a mandrel three times its own diameter and there are no indications of any cracking of the coating composition of the applied coating.

Additional samples of the coated wire are heated in an oven maintained at a temperature of about 650° C. for a period of about 3 hours, during which time substantially all the anionic surfactant, the non-ionic wetting agent, and the organic substituents of the organopolysiloxane are removed from the applied coating. The resulting inorganic coating maintains good adhesion, and the insulated wire can be wound around a mandrel having a cross sectional diameter of one inch without the inorganic coating cracking or otherwise separating from the wire. Four NEMA twisted pairs, using one-third the specified number of twists per inch, were prepared and the wire-to-wire breakdown strength of these four twisted pairs is 800 volts.

Other twisted pairs are prepared in accordance with the above procedure and these twisted pairs satisfactorily maintained 700 volts dielectric strength for a period of 18 hours at a temperature of about 650° C.

Since different embodiments of this invention can be made without departing from the scope thereof, it is to be understood that the above description and drawings are illustrative of the invention, and not in limitation thereof.

We claim as our invention:

1. A coating composition suspended in a liquid medium and adapted for electrophoretic deposition consisting essentially by weight, of from 95 parts to 40 parts of finely divided mica flakes, from 5 parts to 60 parts of an organopolysiloxane, from 0.02 part to 0.5 part of an anionic surfactant, and from 1 part to 5 parts of a non-ionic wetting agent.

2. A coating composition suspended in a liquid medium and adapted for electrophoretic deposition consisting essentially by weight, of from 95 parts to 40 parts of mica flakes having a particle size of from about 0.5 micron to 25 microns, from 5 parts to 60 parts of a tolyl methyl phenyl siloxane resin having a ratio of total number of tolyl, methyl, and phenyl groups to silicon of from 1.3 to 1.6, from 0.02 part to 0.5 part of an anionic surfactant, and from 1 part to 5 parts of a non-ionic wetting agent.

3. A coated electrical conductor consisting essentially, in combination, of a metallic conductor and a coating composition applied thereto, said coating composition consisting essentially of mica flakes having a particle size of from about 0.5 micron to 25 microns, and a tolyl methyl phenyl siloxane resin having a ratio of total number of tolyl, methyl, and phenyl groups to silicon of from 1.3 to 1.6.

4. A coated electrical conductor consisting essentially, in combination, of a metallic conductor, and a tough, flexible coating applied to the metallic conductor comprising mica flakes suspended in an organopolysiloxane resin, said suspension consisting essentially of, by weight, from 95 parts to 40 parts of mica flakes having a particle size of from about 0.5 micron to 25 microns, from 5 parts to 60 parts of a tolyl methyl phenyl siloxane resin having a ratio of total number of tolyl, methyl, and phenyl groups to silicon of from 1.3 to 1.6, together with from 0.02 part to 0.5 part of an anionic surfactant, and from 1 part to 5 parts of a non-ionic wetting agent.

5. An insulated electrical conductor consisting essentially in combination, of a metallic conductor, and an inorganic insulating coating applied to the metallic conductor, said inorganic insulating coating consisting essentially of finely divided mica flakes and cooperative therewith a sintered organopolysiloxane residue substantially free from organic matter.

6. An insulated electrical conductor consisting essentially, in combination, of a metallic conductor, and a substantially inorganic insulating coating applied to the metallic conductor, said inorganic insulating coating consisting essentially of a cooperative association of finely divided mica flakes and a sintered residue of an organopolysiloxane resin derived from a tolyl methyl phenyl siloxane resin having a ratio of total number of tolyl, methyl, and phenyl groups to silicon of from 1.3 to 1.6.

References Cited in the file of this patent

UNITED STATES PATENTS

| | | |
|---|---|---|
| 2,421,652 | Robinson | June 3, 1947 |
| 2,478,322 | Robinson | Aug. 9, 1949 |
| 2,495,630 | Dorst | Jan. 24, 1950 |
| 2,650,975 | Dorst | Sept. 1, 1953 |
| 2,707,703 | Dorst | May 3, 1955 |
| 2,743,192 | White | Apr. 24, 1956 |
| 2,865,795 | Morrison | Dec. 23, 1958 |
| 2,927,909 | Lyons | Mar. 8, 1960 |
| 2,936,218 | McNeill | May 10, 1960 |
| 2,984,590 | Anderson | May 16, 1961 |